Figure 6:
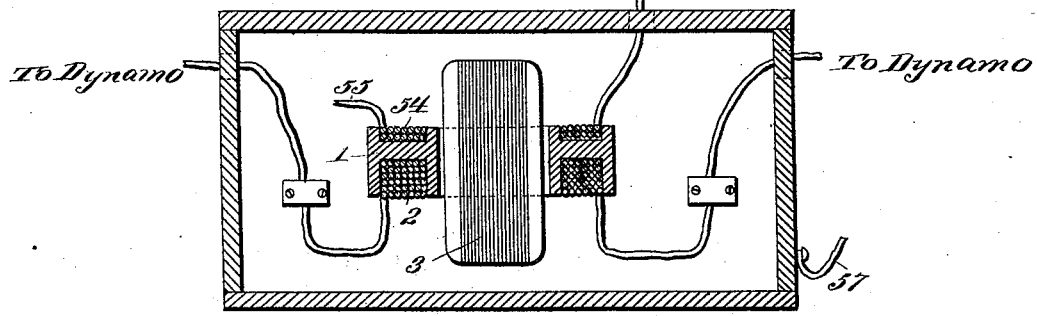

(No Model.) 3 Sheets—Sheet 1.
H. LEMP & C. G. ANDERSON.
ELECTRIC WELDING MACHINE.
No. 519,336. Patented May 8, 1894.
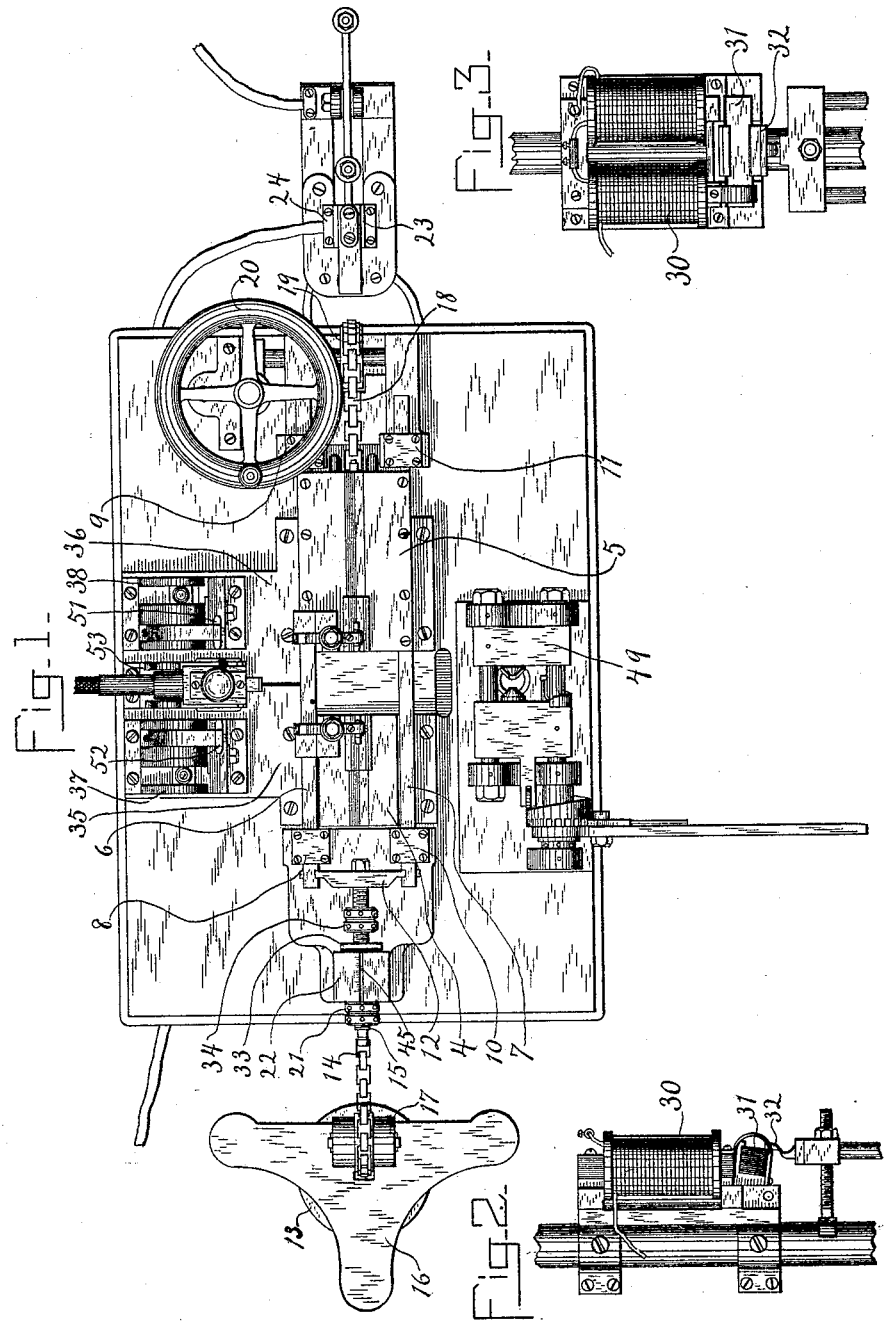
WITNESSES:
INVENTORS.
Hermann Lemp
Carl G. Anderson
By H. C. Townsend
Atty (No Model.) 3 Sheets—Sheet 2.
H. LEMP & C. G. ANDERSON.
ELECTRIC WELDING MACHINE.
No. 519,336. Patented May 8, 1894.
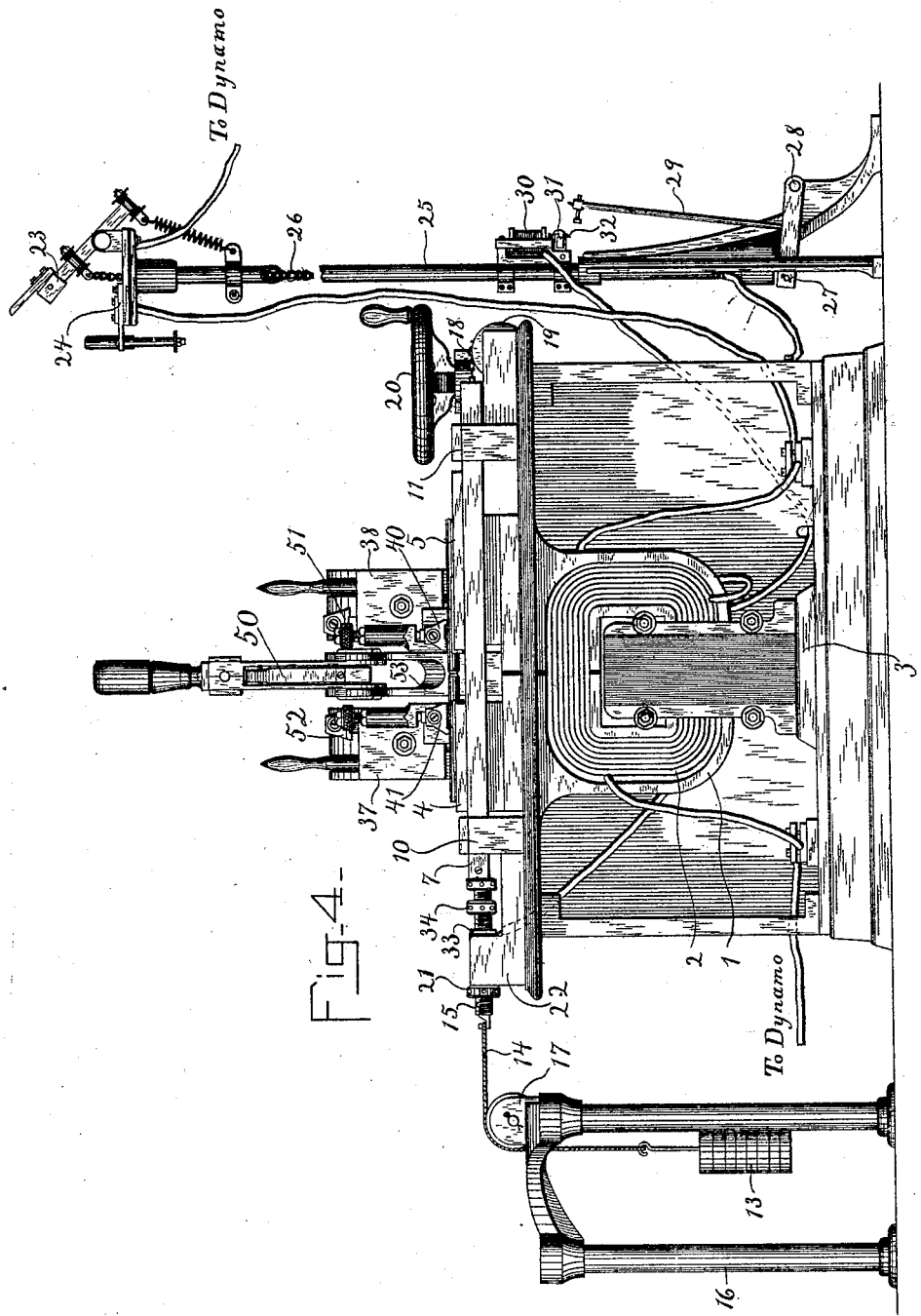
WITNESSES:
INVENTORS.
Hermann Lemp
Carl G. Anderson
By H. L. Townsend Atty (No Model.) 3 Sheets—Sheet 3.

H. LEMP & C. G. ANDERSON.
ELECTRIC WELDING MACHINE.

No. 519,336. Patented May 8, 1894.

WITNESSES:
Wm. S. Capel.
J. F. Conroy.

INVENTOR:
Hermann Lemp
Carl G. Anderson
By H. C. Townsend
Atty.

THE NATIONAL LITHOGRAPHING COMPANY,
WASHINGTON, D. C.

UNITED STATES PATENT OFFICE.

HERMANN LEMP AND CARL GUSTAF ANDERSON, OF LYNN, MASSACHUSETTS, ASSIGNORS TO THE THOMSON ELECTRIC WELDING COMPANY, OF MAINE.

ELECTRIC WELDING-MACHINE.

SPECIFICATION forming part of Letters Patent No. 519,336, dated May 8, 1894.

Application filed May 26, 1891. Serial No. 394,201. (No model.)

*To all whom it may concern:*

Be it known that we, HERMANN LEMP, a citizen of the United States, and CARL GUSTAF ANDERSON, a subject of the King of Sweden and Norway, both residents of Lynn, in the county of Essex and State of Massachusetts, have invented certain new and useful Electric Welding-Machines, of which the following is a specification.

Our invention relates to apparatus employed in electric welding or other metal working operations wherein electricity is used as the heating agent.

The invention relates more particularly to an electric welding machine designed to provide the proper appliances for cutting off the heating current automatically, applying the proper regulable pressure, removing the burr of any welding and reducing or hammering down the burr.

The machine as we have herein shown and described it is especially designed for use in welding metals which melt before welding, such as copper, silver, &c., and affords an automatic machine acting reliably to produce uniform results when the machine is adjusted according to predetermined rules.

The heating currents for the machine may be derived from any suitable source though we, by preference, take them from the secondary bar or conductor of a transformer the primary of which has alternating currents circulating in it.

One part of our invention consists in the improved means for cutting off the flow of current in the work and is applicable to any electric metal working machine wherein provision is made for cutting off the current at a predetermined point in the movement of the work after it is softened. Devices of this general character have heretofore been patented and our present invention relates more particularly to the employment of an electromagnet controlling the cut off devices and excited by a current set up in an additional secondary coil or circuit independent of that used in the work.

Another part of our invention consists in the combination with an electric welding machine, of a pair of auxiliary holders independent of those which hold the work when the latter is subjected to the pressure which upsets the metal, said auxiliary holders being connected with some source of heating current the same or independent of that which supplies the heating current for the welding and being themselves unprovided with devices for applying end pressure to the work.

Our invention consists further in the special combinations of apparatus and details of construction hereinafter described and more particularly specified in the claims.

Figure 5:
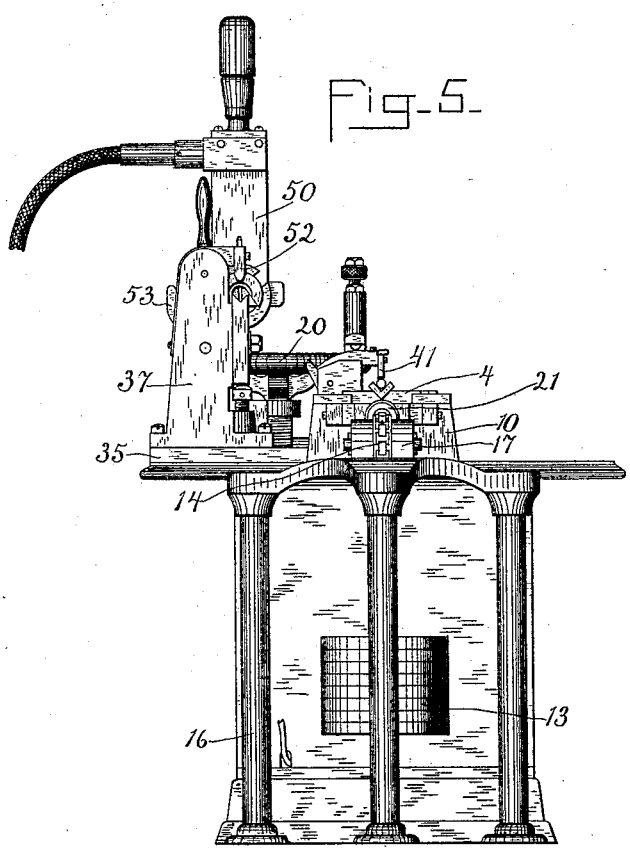

In the accompanying drawings:—Figure 1, is a plan of an apparatus embodying our invention. Fig. 2, is a side elevation of the magnet controlling the cut off. Fig. 3, is an elevation taken at right angles to Fig. 2. Fig. 4, is a side elevation of the machine. Fig. 5, is an end elevation of the machine. Fig. 6, is a horizontal sectional view taken on a plane cutting the primary coil 2, the secondary bar 1, and the additional coil 54, at the top of the laminated core 3.

The two work holding clamps or slides of the apparatus are indicated at 4, 5. These clamp slides or holders are, in a welding machine, movable to and from one another for the purpose of applying the pressure to the work when the same has been heated to a sufficient degree by the heating current. One of the slides may be stationary and the other movable.

5, is the movable slide fastened to and guided by rods 6 and 7, having bearings in the posts 8, 9, 10 and 11. These two rods are connected by a cross piece 12, to which the welding pressure is applied. The pressure is applied by a number of weights 13, which number may be varied for different diameters of stock to be welded. These are hung from a rope or chain 14, which is secured to a rod 15, fastened to the cross piece 12. The weights in falling will evidently cause the slide 5, to move forward, when the pieces heated have sufficiently softened. The stand 16, carries a small pulley 17, over which the rope or chain passes.

The work holders or supports 4, 5, are provided with the usual or any suitable clamping devices the jaws of which are indicated at 40, 41, Fig. 5 for clamping the rods or pieces to be welded.

The work holders 4, 5, are herein shown as forming the terminals of a secondary bar or conductor 1, composed of a copper casting the primary of which 2, consists of a coil of wire wound in a groove in the secondary. The iron core of the secondary is indicated at 3. The two terminals or electrodes of the secondary bar carry the work holders, 4, 5, as shown. Any other form of transformer might be used. The rod 15, Fig. 1 is threaded, and upon it are adjustable nuts 21, 34, that may be set to limit the motion of the slide and engage with a stop arm 22. The slide is moved to its first position after welding, by means of a chain 18, one end of which is attached to the back end of the slide, and the other to a pulley 19, which is rotated by means of a hand wheel 20, geared to the pulley shaft in any well known manner, such as by a worm gear. After a weld has been made, the piece is removed, the hand wheel turned until the nut 21, strikes the post or stop 22,—other pieces to be joined are fastened in the clamp, and the hand wheel turned to slacken the chain 18, allowing the weights to act at the proper moment. The stop 34, stops the movement when the metal softens and allows the clamp 5, to move.

In the circuit with the primary of the transformer is a switch, which is automatically opened at the instant of completion of the weld, to cut off the flow of current through the weld. The switch, consisting of two simple contact plates 23 and 24, Figs. 1 and 4, one mounted on a spring actuated lever, is supported upon a pole 25, made of tubing. A chain 26, connects to the lever and passes down through the pole and ends in a treadle, or similar arrangement to close the switch. In Fig. 4, the lower end of the chain is shown fastened to a lever 27, pivoted at 28. An upright rod 29, is also secured to the lever, so that by pulling it (29) forward, the switch will be closed. The cut off is controlled by a magnet, (see Figs. 2 and 3,) 30, and a pivoted armature 31, with a small catch 32. When the rod 29, is brought forward, closing the switch, the rod engages the catch and the switch or cut off is held.

Beside the primary coil 2, and the secondary bar 1, about the core 3, of the transformer, there is an additional coil 54, (see Fig. 6) which is in series with the magnet 30, Fig. 4, of the cut off and is practically a secondary coil since it receives its current by induction from the primary coil 2. One end of this third coil connects by means of conductor 55, with the insulated plate 33, attached to the post on the left hand side of the welder. The other end connects by means of the conductor 56, with the coil of magnet 30. The other end of the magnet coil connects to the post 25, upon which it is mounted and this post is electrically connected to the frame of the welder by conductor 57. The manner of cutting off is as follows:—The slide 5, in moving forward causes the nut 34, as the weld is completed, to engage the insulated contact plate 33. This causes the current from said third coil 54, to flow over conductor 56, the magnet 30, thence to post 25, from that by conductor 57, to the frame of the welder, through that and posts 9, 10, 11, rods 6, 7, 15, and nut 34, to plate 33, thence by conductor 55, back to said third coil. The magnet 30, is thus energized, armature 31, of the cut-off is attracted, the rod 29, is released and the switch 23, flies open breaking the primary circuit.

The rod 15 carries a pointer 45, as shown in Fig. 1, which moves over a scale and indicates the extent of movement of the clamp in the welding or other operation.

In connection with the apparatus we use any desired construction of burr remover and hammer. The burr remover indicated at 49, Fig. 1, might be of the construction described in patent to Anderson and Tregoning, No. 423,979.

In connection with additional work holders 37, 38, we employ a hammer which may be used to hammer the work. The stationary or additional holders or clamps 37, 38, may be of any desired character adapted to hold the work which has been welded. They are fixed or unprovided with any means for moving the one toward the other. The clamping jaws of these holders are indicated at 51, 52, and may be constructed and operated in any desired way. These additional clamps or holders are mounted upon or in connection with electrodes or terminals of any source of electric energy, but for the sake of convenience we prefer to mount them upon two plates or supports 35, 36, which form extensions of the secondary bar or casting 1, as shown in the plan Fig 1. The hammer, the mechanism of which is indicated at 50, Fig. 4 is mounted upon a suitable standard 53, and in position so that, when the work has been transferred to the holders 37, 38, the hammer may operate upon the burr at the weld. This hammering device we have not described in detail as its construction may be indefinitely varied without departing from our present invention. It is preferably mounted so that it may turn in the standards 53, to various points about the work. Preferably we employ a hammering device such as shown in an application of H. Lemp, C. G. Anderson and G. Landman, filed May 21, 1891, Serial No. 393,541.

After the weld has been formed in the work supported by the holders 4, 5, and the current automatically cut off from the same, as described, the work is removed and placed in the apparatus 49, Fig. 1 which is employed to reduce, but not entirely remove, the burr. The work is then transferred to the holders 37 and 38, with the part where the weld has been formed in position half way between them and the current is turned on until the metal has been sufficiently softened, when the hammer is operated to pound down the remainder of the burr. The current may be turned on by throwing down the switch lever, and may be turned off by releasing the switch by hand.

What we claim as our invention is—

1. In an electric metal working apparatus, the combination with a transformer whose secondary supplies the heating currents, of a cut off for controlling the flow of currents in the primary, and a controlling magnet in a secondary circuit independent of the circuit through which the heating current flows.

2. In an electric metal working apparatus, the combination of a cut off consisting of a circuit breaker in the primary circuit of the apparatus, a secondary circuit supplying the work, a controlling device for said cut off responsive to an electric current, and an additional secondary connected to said controlling device.

3. The combination in an electric welding or other electric metal working apparatus, of the two work holders 4, 5, one of which (5) is movable to and from the other, the ropes or chains connected to the sliding movable clamp at opposite ends thereof, adjustable weights connected to one of said chains for moving the slide in a direction to apply the pressure to the work, and mechanism connected to the other chain or cord for retracting the slide.

4. The combination in an electric metal working apparatus, of a clamp slide 5, a cord or chain 14, connected therewith, the weights 13, sustained by said cord or chain, chain 18, hand wheel 20, and intermediate mechanism for actuating the chain.

5. The combination in an electric welding apparatus, of a movable work holder 5, a rod 15, secured thereto and connected with devices for applying pressure to the work, and the adjustable stop nuts 21, 34, upon said rod, for limiting the movement of said work-holder in both directions.

6. The combination in an electric metal working apparatus, of a movable work holder 5, an adjustable stop connected therewith, a contact in the path thereof, and a cut off magnet the circuit of which is connected to said contact.

7. In an electric metal working apparatus, the combination substantially as described, of a movable work holder 5, provided with means constantly tending to move it forward, a retracting chain 18, wheel 19, and the operating hand wheel 20.

8. The combination in an electric metal working apparatus, of the cut off switch mounted upon a suitable support, an actuating chain therefor extending down through said support and connected at its foot with a lever, a vertical arm 29, connected to the said lever for holding the switch closed, and releasing device for said arm.

9. The combination substantially as described, in an electric metal working apparatus, of a cut off switch mounted upon a suitable standard or support, a chain extending down through said standard and connected to the lever 27, an arm 29, and a cut off magnet controlling a catch in the path of the arm.

10. In an electric metal working apparatus, the combination substantially as described with the movable work holder, of the bars 6, 7, guide posts or bearings 8, 9, &c., cross head 12, bar or rod 15, connected therewith and carrying suitable adjustable stops, a chain connected with said bar or rod 15, and an adjustable weight sustained by the chain.

11. The combination in an electric metal working apparatus, of a movable clamp slide or holder connected to a number of weights variable for different diameters of stock to be welded, and mechanism for retracting the clamp slide or holder and at the same time lifting the weights, as and for the purpose described.

12. The combination substantially as described with a stationary work-holder the movable clamp slide or holder, a rod 15, connected to said movable holder and adjustable nuts 21, 34 thereupon at opposite sides of the standard 22, as and for the purpose described.

13. The combination substantially as described, in an electric welding apparatus, of work holders 4, 5, and additional stationary holders 37, 38, mounted in connection with a source of heating currents, supplying heating currents to holders 4, 5, and a hammer or compressing device mounted in position between said holders.

14. The combination in an electric metal working apparatus, of the two work holders 4, 5, means for moving one of them toward the other, and additional or auxiliary supports 37, 38, for the work fixed with relation to one another, and mounted upon extensions of the terminals or electrodes which carry the holders 4, 5, as and for the purpose described.

15. The combination in an electric metal working apparatus, of suitable work holders 4, 5, provided with means for moving one toward the other, fixed holders 37, 38, mounted on extensions of the terminals which carry the holders 4, 5, and a suitable hammer or other device for operating upon the heated metal and mounted in position to operate upon the work supported by the holders 37, 38.

16. The combination in an electric welding apparatus, of two work holders 4, 5, provided with means for moving one toward the other, the additional fixed work holders 37, 38, mounted upon a support in electrical connection with the terminals of the heating source which supplies holders 4, 5 a burr reducer 49, and a hammer as and for the purpose described.

Signed at Lynn, in the county of Essex and State of Massachusetts, this 18th day of May, A. D. 1891.

HERMANN LEMP.
CARL GUSTAF ANDERSON.

Witnesses:
JOHN W. GIBBONEY,
WARREN B. LEWIS.